Oct. 17, 1967          J. A. WILSON           3,347,110
              ANTI-BACKLASH GEAR APPARATUS
                   Filed Dec. 10, 1965

Witness

Rosalind Tsai

INVENTOR.
Jean A. Wilson
BY
Marshall J. Breen
ATTORNEY

United States Patent Office 3,347,110
Patented Oct. 17, 1967

3,347,110
ANTI-BACKLASH GEAR APPARATUS
Jean A. Wilson, Elizabeth, N.J., assignor to The Singer Company, New York, N.Y., a corporation of New Jersey
Filed Dec. 10, 1965, Ser. No. 512,912
3 Claims. (Cl. 74—397)

This invention relates in general to gears, and in particular to assemblages thereof.

Where a first gear supported by a shaft serves as a drive for a second gear mounted on another shaft, it is oftentimes necessary to provide an idler gear between the first and second gears to effect driving of the second gear in a particular predetermined direction. For example, a common motor drive in an ordinary sewing machine drives a needle actuating shaft from which is driven simultaneously a work feed actuating shaft. To avoid blacklash and frictional wear among such gears, it is essential that the gears mesh properly.

The proper mesh of a plurality of gears may be effected by manufacturing them and their supports, and positioning such supports, to within very close tolerances. This obviously is expensive from a manufacturing standpoint. The prior art is replete with examples of the use of eccentric devices by which pairs of gears may be adjusted to mesh properly, e.g., United States Patent No. 2,549,241, issued Apr. 17, 1951, whereby tolerance control during manufacturing may be relaxed. Such techniques are usually not practical where say three gears are desired to mesh, the reason being that eccentric adjustment for proper mesh of one pair of gears often brings two of the other gears out of mesh.

By means of the invention, three or more intermeshing gears may be adjustably brought into proper relative mesh without need for eccentric devices. In other words, manufacturing standards as to the nature and quality of gears and their mountings may here be relaxed, whereby when proper adjustment of such gears is made, a high performance end product still results, and attendantly at low cost.

Figure 2:
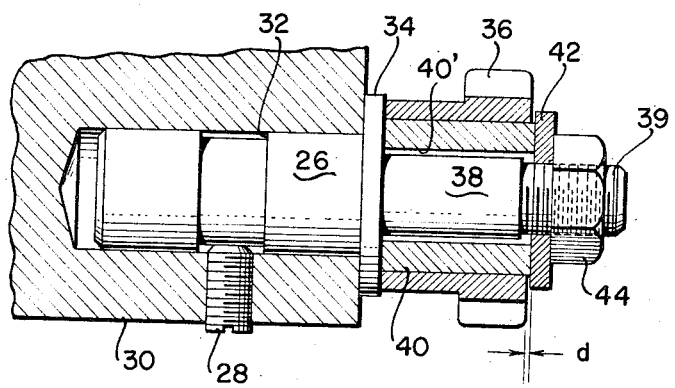
Figure 1:
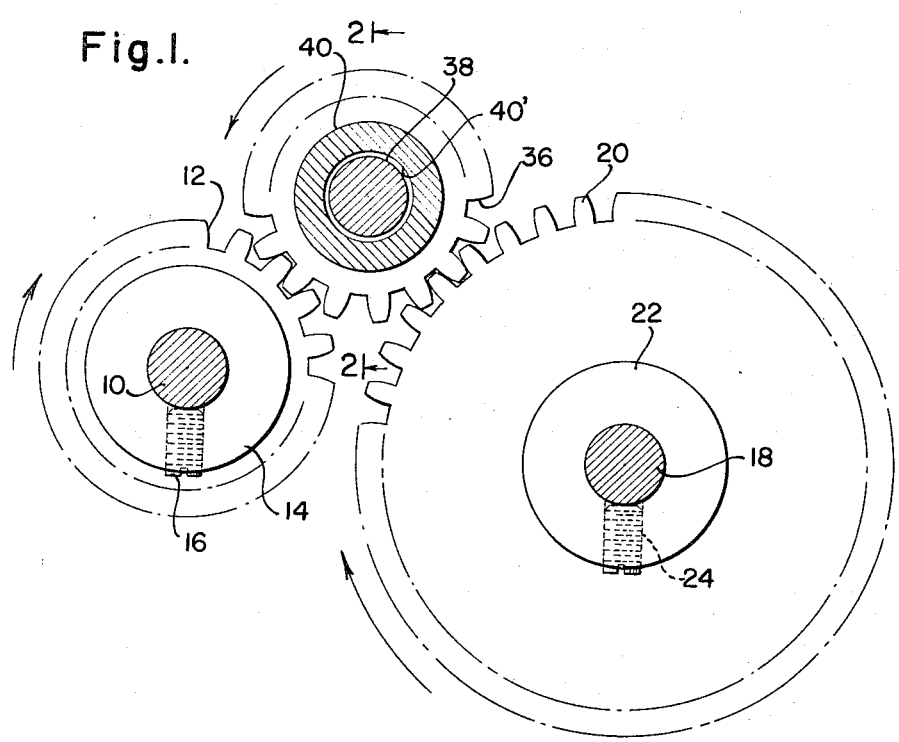

The object of the invention is to provide an adjustable idler gear for use in meshing with a pair of other gears both of which do not intermesh. The invention will be described with reference to the figures wherein:

FIG. 1 is a schematic end view of an arrangement of gears that shows an idler gear embodying the invention, and FIG. 2 is a longitudinal sectional view of the idler gear and its mount, taken substantially along lines 2—2 of FIG. 1.

Referring to the figures, a rotatably supported drive shaft 10 supports a gear 12, the hub 14 of which is tapped to accommodate a set screw 16 that may be adjustably brought to bear against the shaft 10 to hold the gear fixedly in place on the shaft 10. A second rotatably supported shaft 18, constituting the drivable member, supports a gear 20, the hub 22 of which is tapped to accommodate a set screw 24 for holding the gear 20 fixedly in place on its shaft 18. The shafts 10 and 18 are adapted to be parallel to each other, and are spaced apart sufficiently to prevent intermeshing of the gears 12 and 20, which gears are designed with similar teeth.

A support member or stud 26 (see FIG. 2) is preferably fixed by means of a set screw 28 in a frame 30. The body of the stud 26 is provided with an annular recess 32 into which the set screw 28 extends to bear against the stud 26, thereby preventing the stud from moving. A collar 34 or shoulder preferably in the form of a flange on the stud 26 serves as a first thrust bearing for an idler gear 36, and separates the body of the stud 26 from a reduced outboard part 38 that extends from the frame 30, such outboard part 38 having a threaded end 39. A bushing 40 having a bore 40' of larger diameter than the outer diameter of the outboard part 38 of the stud is mounted on the stud. The stud 26 locates with respect to the frame 38 in a way that permits the teeth of the idler gear 36 to mesh with the teeth of the gears 12 and 20. The bushing 40 serves as a journal for the idler gear 36, being axially longer than the idler gear 36 by a distance $d$. A washer 42 is supported on the threaded end 39 of the outboard part 38 of the stud 26 and provides a second thrust bearing for the idler gear 36. A nut 44, when threaded tightly onto the stud end 39, causes the washer 42 to bear against and clamp or lock the bushnig 40 in a selected adjusted position between the washer 42 and the collar 34.

Assembly of the gear 36 and its improved mounting means is as follows: With the shaft-supported gears 12 and 20 and the stud 26 properly in place, the bushing 40 is slid over the stud part 38. Then the idler gear is placed on its journal, i.e., the bushing 40, after which the washer 42 and nut 44 are loosely placed on the stud end 39. Since the bushing 40 is radially freely movable relatively to the outboard end of the stud 26, it may be moved around manually until its supported idler gear 36 properly meshes with the gears 12 and 20. Then the nut 44 is tightened down against the washer 42 which in turn clamps the bushing 40 in place against the collar 34; and, since the bushing is axially longer than the idler gear 36, the gear is only radially locked in place, being freely rotatable on the bushing 40 for transmitting rotary motion from the drive gear 12 to the driven gear 20 as indicated by the arrows on FIG. 1.

While the invention has been described in its presently preferred embodiment, it is to be understood that the words which have been used are words of description rather than of limitation and that changes within the purview of the appended claims may be made without departing from the true scope and spirit of the invention.

Having thus set forth the nature of tne invention, what is claimed herein is:

1. Gear apparatus for use in an adjustable train of gears comprising a support member, a bushing adapted to be mounted on a portion of said support member, said bushing having an axial opening sufficiently wide for a loose fit of said bushing on said portion of said support member, a gear rotatably mounted on said bushing, said gear being axially shorter than said bushing, abutment means axially fixed with respect to said support member, and means for use in axially pressing said bushing against said abutment means, whereby said bushing is clamped in place with respect to said member, and whereby the location of the rotary axis of said gear may be adjusted by radially positioning said bushing relatively to its support member prior to clamping it in place on said support member.

2. Gear apparatus comprising a stud having a cylindrically shaped part, one end of said part being provided with an enlarged collar and the other end of said part being provided with threads, a bushing of larger inner diameter than the outer diameter of said cylindrically shaped part supported on said part, an idler gear rotatably supported on said bushing in journal bearing relationship, said gear being axially shorter than said bushing and said bushing being axially shorter than said cylindrically shaped part, a washer of larger outer diameter than the inner diameter of said gear, said washer being so supported axially on said cylindrically shaped part that said bushing and gear locate between said collar and said washer, and a nut adapted to be screwed onto said threads and against said washer, whereby said bushing is pressed between said collar and said washer.

3. The apparatus of claim 2 including means providing a drive gear, means providing a drivable gear, means for supporting said drive gear and said drivable gear for rotation in such spaced apart relationship that their respective teeth do not mesh, and means for so supporting said stud that the teeth of said idler gear may mesh with the teeth of both said drive gear and said drivable gear.

References Cited

UNITED STATES PATENTS

| | | | |
|---|---|---|---|
| 2,382,846 | 8/1945 | Barber | 74—397 X |
| 2,526,964 | 10/1950 | Muller | 74—397 |
| 2,549,241 | 4/1951 | Rorive | 74—397 |
| 2,810,299 | 10/1957 | Partridge | 74—409 |

DONLEY J. STOCKING, *Primary Examiner.*

L. H. GERIN, *Assistant Examiner.*